Nov. 17, 1942. A. M. SIGNALNESS 2,301,978
FRAME ASSEMBLY FOR A DIAPHRAGM-OPERATED VALVE
Filed April 15, 1941
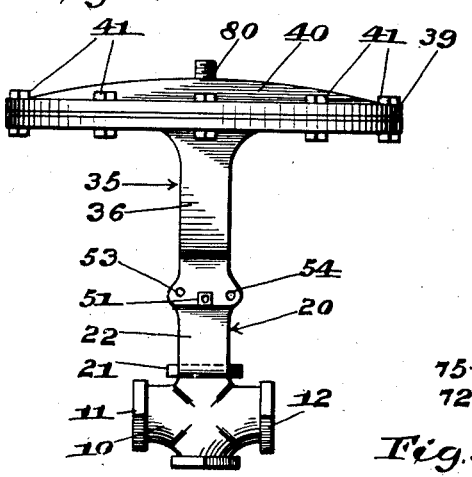
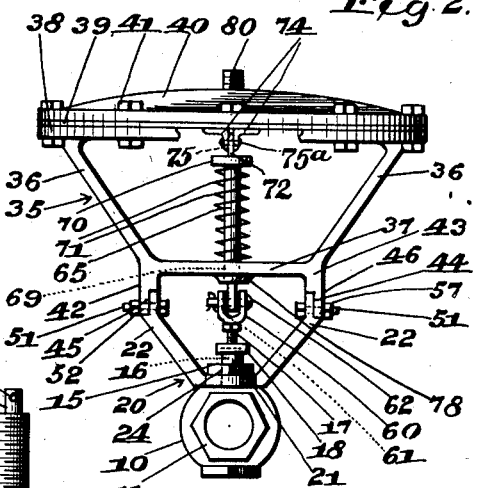
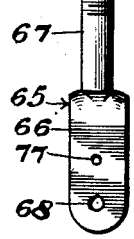
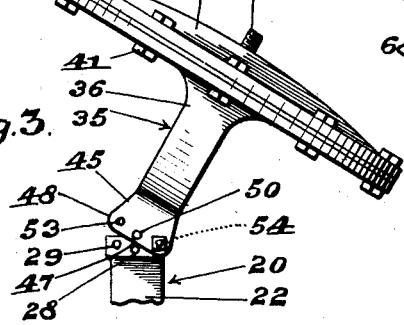
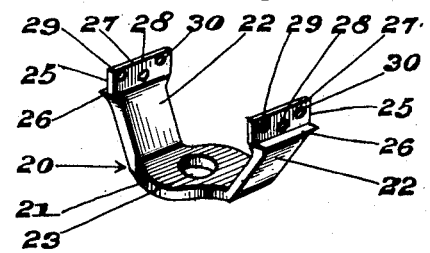
Inventor
A. M. Signalness.
By Munn, Anderson & Liddy
Attorneys Patented Nov. 17, 1942

2,301,978

UNITED STATES PATENT OFFICE 2,301,978

FRAME ASSEMBLY FOR DIAPHRAGM-OPERATED VALVE

Alfred M. Signalness, North Bend, Oreg.

Application April 15, 1941, Serial No. 388,673

5 Claims. (Cl. 137—111)

This invention relates to a frame assembly for a diaphragm-operated valve.

An object of the invention is the provision of a frame assembly for supporting a diaphragm, a rod operated by a diaphragm which is connected to a valve-operating rod, the assembly being such that a portion of the frame may be disconnected from the remaining portion so that the diaphragm and the rod operated by the diaphragm may be moved to an inclined position so that the diaphragm may be readily removed or repaired.

Another object of the invention is the provision of a frame assembly for a diaphragm in which the frame is formed of two parts hingedly connected together in such a manner that the parts may be clamped together and maintained in a vertical position or the parts may be released so that the part carrying the diaphragm may be provided with a new pivoted point to permit the diaphragm and its connection parts to be tilted to one side of the vertical.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a view in elevation of a frame assembly for supporting a diaphragm and the operating part between a valve and the diaphragm, Figure 2 is a view in elevation at right angles to the view shown in Fig. 1, Figure 3 is a view in elevation similar to Fig. 1 showing a new pivotal connection between the parts of the frame to permit the diaphragm to tilt to one side, Figure 4 is a view in perspective of the lower part of the frame assembly, Figure 5 is a view in elevation of a diaphragm-operated rod shown detached from the assembly, and Figure 6 is a side view in elevation of a valve cage and an integrally formed supporting bracket.

Referring more particularly to the drawing, 10 designates a valve casing in which is mounted a valve (not shown) for closing communication between the opposite ends 11 and 12 of the casing which forms a connection between pipes.

A nipple 15 is either threaded into an opening in the top of the casing or the nipple may be formed integrally with the casing and is provided with a central passage 16 opening into the casing so that a valve stem 17 may move into the casing for operating the usual valve therein. A packing nut 18 is threaded onto the outer end of the nipple 15.

A U-shaped member generally designated by the numeral 20 is provided with a bridging member 21 and outwardly flared arms 22. This bridging member, as shown in Fig. 4, is provided with a central opening 23 which receives the nipple 15. A nut 24 threaded onto the nipple secures the bridging member 21 and likewise the curved members 22 to the casing 10. It will be noted that the arms 22 extend outwardly from the opposite sides of the casing and upon opposite sides of the longitudinal axis of said casing. The upper end of each arm, as shown at 25, is cut away to form a shoulder 26 and a flat vertical surface 27. The flat portion 27 is provided with a central opening 28 and openings 29 and 30 are located at either side of the central opening 28.

A U-shaped bracket, generally designated by the numeral 35, is provided with outwardly flared upstanding arms 36 and a bridging member 37. The upper ends of the arms are connected in any approved manner to a ring or plate 38 to which is bolted a diaphragm 39 and a cover plate 40, as shown at 41.

Legs 42 and 43 depend from the end of the bridging member 37 and are provided with cutaway portions 44 to form reduced fingers 45 and 46. The finger 45 engages one member 27 of the arm 22 of the U-shaped member 20 while the other finger engages the other member 27 of the arm 22 so that the lower end 47 of each finger rests upon a shoulder 26 of an arm 22. It will be noted that the outer ends of each finger are curved, as shown at 48, for a purpose which will presently be explained.

Each finger is provided with an opening 50 which aligns with the opening 28 and when these openings are aligned a threaded bolt 51 is adapted to be inserted through the aligned openings and a nut 52 is screwed on the inner ends of the bolts for connecting the legs 42 and 43 to the respective members 27 of the arms 22 and for clamping the legs against movement.

The bolt 51 is located in the aligned passages 50 and 28, respectively, in the legs 45 and 46 and the arms 22. This bolt, however, may be removed from these openings and inserted in openings 53 in the fingers 45 and 46 and in the openings 29 in the arms 22. The bolt, however, may be inserted through opening 30 in the arms 22 and through aligned openings 54 in the fingers 45 and 46 and they are so positioned in either the openings 29 or 30 that the U-shaped member 35 may be tilted to one side of the vertical, as shown in Fig. 3.

Referring more particularly to Fig. 6 it will be seen that a modified form of the casing is provided in which a casing 10a has integrally formed flared arms 22a extending upwardly from said casing. The free ends of the arms are cut away to form the flat portions 27 and shoulders 26. The flat portions are provided with the three perforations 28 to 30, inclusive, as shown in Figs. 1 to 4, inclusive.

A nipple 15 is either formed integrally with the casing 10a or is threaded therein and this nipple is hollow to provide a guide for the valve operating rod 17. A yoke 60 is secured to the outer end of the rod 17 and its arms have passages 61 to receive a cotter pin or connecting bolt 62 shown in Fig. 2.

A diaphragm operated rod, generally designated by the numeral 65 has a wide flat portion 66 and a narrow round portion 67. The wide portion is provided with a passage 68 to receive the cotter pin 62 or a bolt which passes through the perforations 61 in the arms of the yoke 60.

The bridging member 37 is provided with a slot 69 and this slot receives the wide portion 66 of the rod 65. Above the bridging member the reduced portion 67 is provided with a shoulder or nut 70, against which one end of a coil spring 71 bears. The other or lower end of the coil spring rests upon the bridging member 37.

The extreme reduced end 72 is provided with a passage 75 to receive a pin 75a or other pivotal connecting means which is carried by perforations in ears 74 secured to the diaphragm 39.

A cotter pin (not shown) is adapted to be inserted in a passage 77 and this passage is moved below an enlargement 78 formed at the underface of the bridging member 37 when the U-shaped member 35 is tilted to one side of the vertical, as shown in Fig. 3, for a purpose which will be presently explained.

Instead of the single bolt 51, which is placed in the aligned passages 50 and 28, as shown in Fig. 1, two bolts may be placed in the aligned passages 54, 30 and 29, 53 for clamping the U-shaped member in a vertical position and during the normal operation of the device. When it is desired to tilt the U-shaped member 35 to one side of the vertical one of the bolts may be removed and the nut on the other bolt can then be loosened so that the U-shaped member 35 may be rocked on a pivot corresponding to the perforations 53 or perforations 54.

When it is desired to remove the diaphragm and the cover plate 40 together with the integrally formed inlet pipe 80, the bolt 51 is removed from the openings 50 and placed in one of the openings 53 or 54, as the case may be. Then the U-shaped member 35 may be tilted to the position shown in Fig. 3. When this happens the lower end of the rod 65 will be pulled downwardly because the pivotal point of the lower end of the rod is to one side of the pivotal point of the U-shaped member 35. At this time the coil spring 71 is placed under tension and a cotter pin is then inserted through the opening 77 beneath the enlargement 78 to retain the rod 65 in its adjusted position.

By this construction it is possible to remove the diaphragm and replace it without necessitating the removal of the entire frame and its connections with the valve rod 17.

It will be noted that in Fig. 6 the arms 22a are integrally formed with the valve casing 10 and this type of construction is cheap to manufacture, in that it reduces the number of parts of the complete assembly besides considerable machine work. The integral formation also facilitates the quick dismantling and assembling of the unit for servicing and this is particularly true when repacking the valve stem.

Furthermore, it can be more conveniently applied because it does not require the additional operation of securing the bracket to the valve casing as shown in Figs. 1 to 4, inclusive. Furthermore, it decreases the over-all height of the support for the diaphragm.

I claim:

1. A support for a diaphragm assembly comprising a U-shaped bracket including a bridging member, spaced legs depending from the ends of the bridging member, a U-shaped member connected to a valve casing and having upstanding arms, means removably connecting the free ends of the arms with the free ends of the depending legs along a line passing centrally through said arms and legs, the free ends of the legs and the arms having aligned passages at each side of the central line to receive the connecting means when removed from the central passage to permit the bracket to tilt to one side of the normal vertical position of the bracket, a diaphragm operated rod slidably mounted in the bridging member, a valve-operating rod slidably mounted in the second U-shaped member, and means pivotally connecting the adjacent ends of the two rods in horizontal alignment with the removable connections between the legs and the arms.

2. A support for a diaphragm assembly comprising a U-shaped bracket including a bridging member, spaced legs depending from the ends of the bridging member, a U-shaped member connected to a valve casing and having upstanding arms, means removably connecting the free ends of the arms with the free ends of the depending legs along a line passing centrally through said arms and legs to hold the bracket in a vertical position, a diaphragm operated rod slidably mounted in the bridging member, a valve operating rod, means pivotally connecting the adjacent ends of the two rods in the same vertical plane with the removable connections between the legs and the arms, a shoulder at the upper end of the diaphragm-operated rod, a compression spring embracing the said rod and having one end engaging the bridging member of the bracket and the other end engaging the shoulder, the free ends of the arms and legs having bearings at one side of the central line to receive the connecting means when removed for pivotally connecting the arms and legs together to permit tilting of the bracket, tilting of the bracket causing the spring to be placed under compression and the diaphragm-operated rod to be moved downwardly, said rod having a perforation to receive a pin which will engage the underface of said bridging member to retain the said rod against upward movement.

3. A support for a diaphragm assembly comprising a U-shaped bracket including a bridging member, spaced legs depending from the ends of the bridging member, a supporting member connected to a valve casing and having upstanding arms, means removably connecting the free ends of the arms with the depending legs along a line passing centrally through said arms and legs, means cooperating with the removable means for retaining the bracket in vertical position, a diaphragm operated rod slidably mounted in the bridging member, a valve operating rod slidably mounted in the supporting member, and means pivotally connecting the adjacent ends of the two rods in alignment with the removable connections between the legs and the arms and along a line passing centrally of the bracket, said removable means adapted to be shifted to one side of the central line for connecting the free ends of the arms with the free ends of the depending legs so that the bracket may be tilted.

4. A support for a diaphragm assembly comprising a U-shaped bracket including a bridging member, spaced legs depending from the ends of the bridging member, a supporting member connected to a valve casing and having upstanding arms, means removably connecting the free ends of the arms with the free ends of the depending legs along a line passing centrally through said arms and legs, means cooperating with the removable means for retaining the bracket in vertical position, a diaphragm operated rod slidably mounted in the bridging member, a valve operating rod slidably mounted in the supporting member, means pivotally connecting the adjacent ends of the two rods in alignment with the removable connections between the legs and the arms and along a line passing centrally of the bracket, a shoulder on the diaphragm, and a spring embracing the diaphragm-operated rod and having its ends located between the shoulder and the bridging member for engaging the connected rods upwardly, said removable means adapted to be shifted to one side of the central line for pivotally connecting the free ends of the arms with the free ends of the depending legs so that the bracket may be tilted.

5. A support for a diaphragm assembly comprising a valve casing, curved arms integrally formed with said casing, the free ends of the arms being flared outwardly from each other and provided with a plurality of passages, one of said passages in each end being displaced from horizontal alignment with the other passages, a valve operating rod having one end projecting into the casing, the other or outer end having passages in line with the displaced passages, a diaphragm-operated rod having a passage at one end, means in the passages in the rods pivotally connecting the rods together, a diaphragm support and guide for the last-mentioned rod and having perforations alining with the passages in the free ends of the arms, and means received by the displaced passages and similarly alined perforations in the support for connecting the support with the free ends of the arms said last mentioned means being shiftable from the displaced passages to alined passages at either side of the displaced passages in both the free ends of the arms and the support for pivotally connecting the arms with the support so that the bracket may be tilted.

ALFRED M. SIGNALNESS.